United States Patent
Roberts

(10) Patent No.: US 7,639,887 B2
(45) Date of Patent: Dec. 29, 2009

(54) ERROR DIFFUSION-BASED IMAGE PROCESSING

(75) Inventor: Eric J. Roberts, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 11/011,737

(22) Filed: Dec. 14, 2004

(65) Prior Publication Data
US 2006/0126957 A1 Jun. 15, 2006

(51) Int. Cl.
G06K 9/36 (2006.01)
H04N 1/405 (2006.01)
G06K 9/46 (2006.01)

(52) U.S. Cl. .................. 382/252; 358/296

(58) Field of Classification Search ............. 382/162, 382/164, 165, 172, 173, 178, 218, 219, 234, 382/252, 260–264, 270, 304; 358/1.1, 1.9, 358/3.03, 3.04, 296, 447, 463, 465, 466
See application file for complete search history.

(56) References Cited

U.S. PATENT DOCUMENTS

| | | | | |
|---|---|---|---|---|
| 5,051,844 A | * | 9/1991 | Sullivan | 358/3.03 |
| 5,130,823 A | * | 7/1992 | Bowers | 358/465 |
| 5,172,247 A | * | 12/1992 | Ghaderi | 358/3.03 |
| 5,243,443 A | * | 9/1993 | Eschbach | 358/3.03 |
| 5,245,678 A | * | 9/1993 | Eschbach et al. | 382/252 |
| 5,271,070 A | | 12/1993 | Truong et al. | |
| 5,434,672 A | * | 7/1995 | McGuire | 358/296 |
| 5,467,201 A | * | 11/1995 | Fan | 358/447 |
| 5,521,989 A | * | 5/1996 | Fan | 382/270 |
| 5,581,371 A | * | 12/1996 | Spaulding et al. | 358/3.03 |
| 5,757,517 A | * | 5/1998 | Couwenhoven et al. | 358/463 |
| 5,848,224 A | | 12/1998 | Nhu | |

(Continued)

FOREIGN PATENT DOCUMENTS

EP 0606988 A2 7/1994

(Continued)

OTHER PUBLICATIONS

"International Search Report for corresponding PCT Application No. PCT/US2005/045884", (Apr. 13, 2006), 4 pgs.

(Continued)

*Primary Examiner*—Amir Alavi
(74) *Attorney, Agent, or Firm*—Schwegman, Lundberg & Woessner, P.A.

(57) ABSTRACT

In an embodiment, a method includes receiving values of a first pixel and a second pixel of an image at an input processor element of an image signal processor and distributing fractional parts of a number of values from surrounding pixels to the first pixel and the second pixel non-serially using first and second accelerator units, respectively, of the image signal processor. The method further includes assigning output values to the first pixel and the second pixel based on the values of the first pixel and the second pixel and the fractional parts of the number of values from the surrounding pixels using an output processor element of the image signal processor and outputting the output values to an output device that has a color range that is less than a color range of the image using the output processor element.

13 Claims, 6 Drawing Sheets

U.S. PATENT DOCUMENTS

| | | | |
|---|---|---|---|
| 6,091,858 A * | 7/2000 | Yoshida | 382/252 |
| 6,307,978 B1 | 10/2001 | Metaxas et al. | |
| 6,760,127 B1 * | 7/2004 | Shin et al. | 358/3.03 |
| 7,057,773 B2 * | 6/2006 | Ilbery | 358/3.05 |
| 7,355,745 B2 * | 4/2008 | Hudson et al. | 358/1.9 |
| 2002/0099797 A1 | 7/2002 | Merrell et al. | |
| 2004/0008382 A1 | 1/2004 | Barbalet et al. | |
| 2006/0126957 A1 * | 6/2006 | Roberts | 382/252 |

FOREIGN PATENT DOCUMENTS

| | | |
|---|---|---|
| EP | 0855831 A2 | 7/1998 |
| IE | 20020457 A1 | 12/2002 |
| JP | 2003283829 A2 | 10/2003 |
| WO | WO-2006/066185 A1 | 6/2006 |

OTHER PUBLICATIONS

Knuth, D. E., "Digital Halftones by Dot Diffusion", *ACM Transactions on Graphics*, 6(4), (Oct. 1987) ,245-273.

Mataxas, P. T., "Optimal Parallel Error-Diffusion Dithering", *Proceedings of the SPIE*, 3648., (Jan. 26, 1999), 485-494.

"Taiwanese Application Serial No. 94144024, Office Action mailed Jan. 14, 2009", 17 pgs.

05854565.8, "European Application Serial No. 05854565.8 , Office Action mailed Mar. 20, 2009", 9 pgs.

Metaxas, P. T, "Optimal Parallel Error-Diffusion Dithering", *Proceedings of the SPIE, SPIE, Bellingham, VA, US*, vol. 3648,XP008027794 ISSN: 0277-786X, (Jan. 26, 1999), pp. 485-494.

* cited by examiner $$202 \begin{cases} \text{accumulator += 1 * eA;} \\ \text{accumulator += 5 * eB;} \\ \text{accumulator += 3 * eC;} \\ \text{accumulator += 7 * eD;} \\ \text{accumulator /= 16;} \end{cases}$$

204 ~ accumulator+ = inputImage[i,j];

$$206 \begin{cases} \text{If accumulator<threshold value then} \\ \quad \text{outputImage[i,j] = 0;} \\ \text{Else} \\ \quad \text{outputImage[i,j] = 1;} \end{cases}$$

208 ~ errorBuffer[j] = accumulator-outputImage[i,j]

FIG. 2

| | 702 | 704 | 706 | 708 | 710 | 712 | 714 | 716 | 718 | 720 | 722 | 724 |
|---|---|---|---|---|---|---|---|---|---|---|---|---|
| INPUT PROCESSOR ELEMENT 402 | READ IN ERROR VALUES eC FOR EVEN AND ODD PIXELS | UNPACK ERROR VALUES eC FOR EVEN AND ODD PIXELS | READ INPUT PIXELS (EVEN AND ODD PIXELS) | UNPACK INPUT PIXELS (EVEN AND ODD PIXELS) | | | | | | | | |
| ACCELERATOR UNIT 410A | | COMPUTE (1*eA) FOR EVEN PIXEL AND NOTIFY 406A | COMPUTE (3*eC) FOR EVEN PIXEL | COMPUTE (7*eD) FOR EVEN PIXEL | COMPUTE ERROR VALUE FOR EVEN PIXEL | COMPUTE (1*eA) FOR THE NEXT EVEN PIXEL | COMPUTE (5*eB) FOR THE NEXT EVEN PIXEL | COMPUTE (3*eC) FOR THE NEXT EVEN PIXEL | | COMPUTE THRESHOLD FOR ODD PIXEL | COMPUTE ERROR VALUE FOR ODD PIXEL | COMPUTE (7*eD) FOR NEXT EVEN PIXEL |
| PROCESSOR ELEMENT 406A | | COMPUTE (5*eB) FOR EVEN PIXEL AND NOTIFY 406A | LOAD eC INTO eB AND NOTIFY 410B | LOAD eB INTO eA | LOAD eC INTO eB | | LOAD eB INTO eA AND NOTIFY 410B | LOAD eC INTO eB AND NOTIFY 410B | | | LOAD eB INTO eA AND NOTIFY 410B | LOAD eC INTO eB AND NOTIFY 410B |
| ACCELERATOR UNIT 410B | | | LOAD eB INTO eA AND NOTIFY 410B | COMPUTE (5*eB) FOR ODD PIXEL AND NOTIFY 406A | COMPUTE (3*eC) FOR ODD PIXEL AND NOTIFY 406A | COMPUTE THRESHOLD FOR EVEN PIXEL | COMPUTE ERROR FOR EVEN PIXEL | COMPUTE (7*eD) FOR ODD PIXEL | COMPUTE ERROR VALUE FOR ODD PIXEL | COMPUTE (1*eA) FOR NEXT ODD PIXEL AND NOTIFY 406A | COMPUTE (5*eB) FOR NEXT ODD PIXEL AND NOTIFY 406A | |
| OUTPUT PROCESSOR ELEMENT 404 | | | | | | | | | UPDATE ERROR BUFFER FOR EVEN PIXEL | OUTPUT VALUE FOR EVEN PIXEL | OUTPUT VALUE FOR ODD PIXEL | UPDATE ERROR BUFFER FOR ODD PIXEL |

FIG. 7

ERROR DIFFUSION-BASED IMAGE PROCESSING

TECHNICAL FIELD

The application relates generally to data processing, and, more particularly, to image processing.

BACKGROUND

Error diffusion is a process for approximating the display of digital images (such as continuous-tone digital images) on output devices that have limited color (tone) range. Error diffusion is most commonly used in printers to simulate multiple color shades with binary dot values. For example, a printer capable of only printing black dots may simulate multiple shades of gray using error diffusion.

BRIEF DESCRIPTION OF THE DRAWING

Embodiments of the invention may be best understood by referring to the following description and accompanying drawing that illustrate such embodiments. The numbering scheme for the Figures included herein is such that the leading number for a given reference number in a Figure is associated with the number of the Figure. For example, a pixel 102 can be located in FIG. 1A. However, reference numbers are the same for those elements that are the same across different Figures. In the drawings:

FIG. 2 illustrates pseudo code for error distribution, according to some embodiments of the invention.

FIG. 7 illustrates a table of operations for error diffusion-based image processing by multiple elements within an image signal processor, according to some embodiments of the invention.

DETAILED DESCRIPTION

Some embodiments provide error diffusion operations. Error diffusion may include three operations. A first operation includes quantizing a current pixel value to generate an output value. In particular, the original pixel value is adjusted to include the errors diffused from surrounding pixels. In some embodiments, the output value for this adjusted current pixel value may be zero or one based on a comparison of the adjusted value to a threshold value. A second operation for error diffusion includes computing the difference (i.e., the error) between the output value and the original pixel value. A third operation for error diffusion includes distributing fractional error values to surrounding pixels. While any of a number of error diffusion filters may be used to diffuse errors to the surrounding pixels, in some embodiments, the Floyd-Steinberg filter is used. Other filters that may be used include the Burkes filter, the Stucki filter, etc.

Figure 1A:
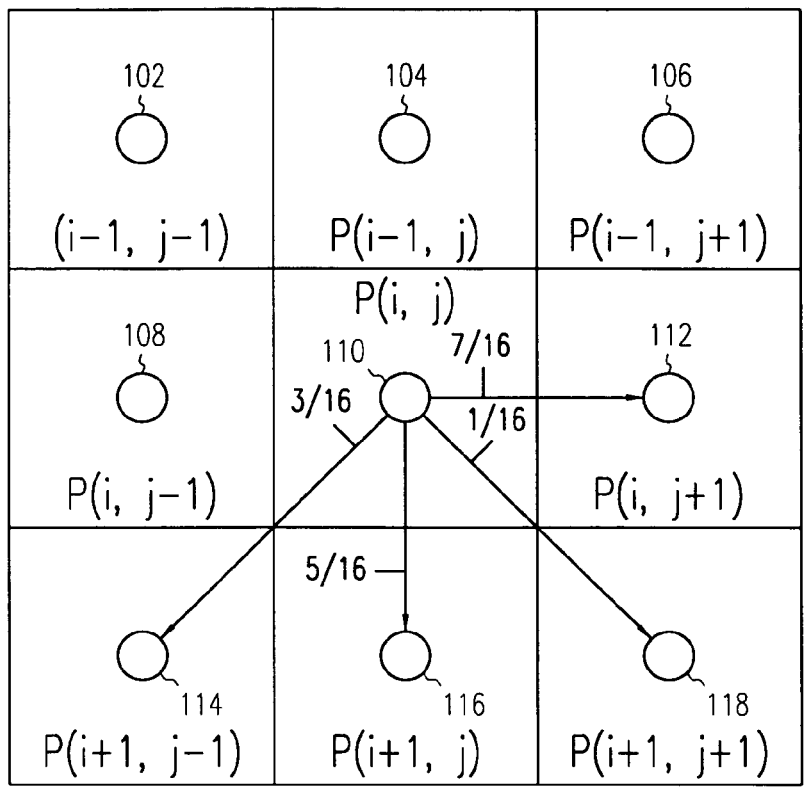
FIG. 1A illustrates distributing of errors from a pixel to surrounding pixels, according to some embodiments of the invention.

FIG. 1A illustrates distributing of errors from a pixel to surrounding pixels, according to some embodiments of the invention. FIG. 1A illustrates part of an image that includes pixels 102-118. The pixels 102-118 are pixels P(i−1, j−1), P(i−1, j), P(i−1, j+1), P(i, j−1), P(i, j), P(i, j+1), P(i+1, j−1), P(i+1, j) and P(i+1, j+1), respectively. As shown, the pixel 110 diffuses 7/16, 3/16, 5/16 and 1/16 of its error value to the pixels 112, 114, 116 and 118, respectively.

Figure 1B:
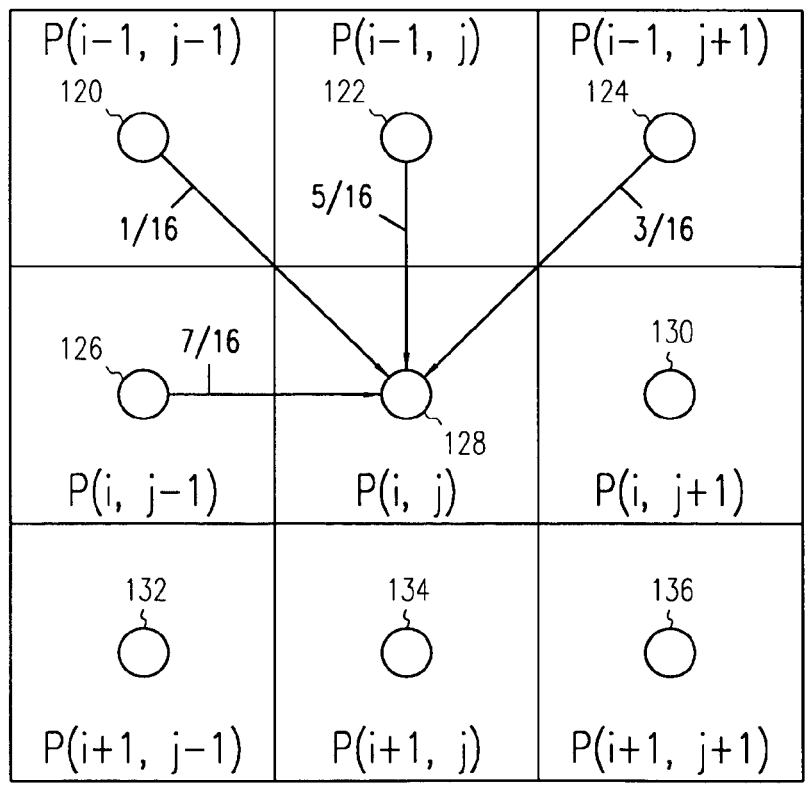
FIG. 1B illustrates distributing of errors to a pixel from surrounding pixels, according to some embodiments of the invention.

FIG. 1B illustrates distributing of errors to a pixel from surrounding pixels, according to some embodiments of the invention. In particular, FIG. 1B illustrates that errors are computed and then distributed to a particular pixel prior to the threshold operation for error diffusion. FIG. 1B illustrates part of an image that includes pixels 120-136. The pixels 120-136 are pixels P(i−1, j−1), P(i−1, j), P(i−1, j+1), P(i, j−1), P(i, j), P(i, j+1), P(i+1, j−1), P(i+1, j) and P(i+1, j+1), respectively. As shown, the pixel 128 receives a fractional error value eA of 1/16 from the pixel 120. The pixel 128 receives a fractional error value eB of 5/16 from the pixel 122. The pixel 128 receives a fractional error value eC of 3/16 from the pixel 124. The pixel 128 receives a fractional error value eD of 7/16 from the pixel 126.

FIG. 2 illustrates pseudo code for error distribution, according to some embodiments of the invention. In particular, FIG. 2 illustrates pseudo code 200 that may be used to perform the error distribution shown in FIG. 1, according to some embodiments of the invention. A code block 202 includes the assignment of the intermediate error values (1/16*eA, 5/16*eB, 3/16*eC, and 7/16*eD) to an accumulator variable. A code statement 204 adds in the value of the pixel at location (i,j) in the image to the accumulator variable. Accordingly, the accumulator variable equals the value of the pixel at location (i,j) plus the intermediate error values received from the surrounding pixels. Examples of the surrounding pixels are set forth below. A code block 206 assigns a value of zero to the pixel at location (i,j) if the accumulator is less a threshold value (e.g., 0.5) and assigns a value of one to this pixel if the accumulator is not less than the threshold value. A code statement 208 updates the error buffer based on a difference between the actual value (the value stored in the accumulator) and the assigned value (zero or one).

Figure 3:
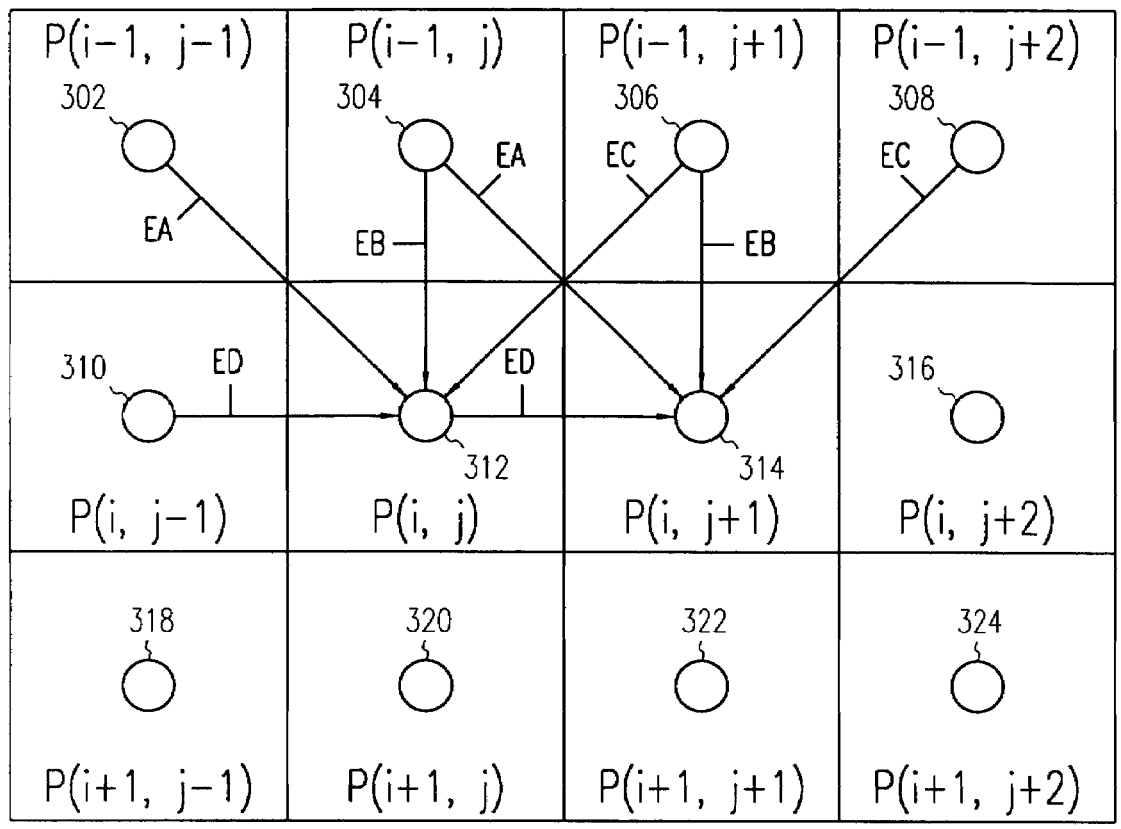
FIG. 3 illustrates data flow of fractional error values to multiple pixels from surrounding pixels, according to some embodiments of the invention.

FIG. 3 illustrates data flow of intermediate error values to multiple pixels from surrounding pixels, according to some embodiments of the invention. FIG. 3 illustrates part of an image that includes pixels 302-324. The pixels 302-324 are pixels P(i−1, j−1), P(i−1, j), P(i−1, j+1), P(i−1, j+2), P(i, j−1), P(i, j), P(i, j+1), P(i, j+2), P(i+1, j−1), P(i+1, j), P(i+1, j+1) and P(i+1, j+2), respectively. The pixels 312 and 314 are defined as the current pixel and the next pixel with regard to computation. A fractional error value eD (7/16) may be diffused from the pixel 310 to the current pixel 312. The fractional error value eD may be generated from an input image 316 and diffused to the current pixel 302. A fractional error value eD (7/16) may be diffused from the current pixel 312 to the next pixel 314. Therefore, the fractional error value eD may be computed as part of the previous pixel's error computation.

Additionally, an error buffer stores a number of intermediate error values that may be diffused from surrounding pixels in the previous row to the current pixel 312 and the next pixel

314. In particular, a fractional error value may be diffused from the pixel 302 to the current pixel 312 (as eA—1/16). A fractional error value may be diffused from the pixel 304 to the current pixel 312 (as eB—5/16) and to the next pixel 314 (as eC—3/16). A fractional error value may be diffused from the pixel 306 to the current pixel 312 (as eC 3/16) and to the next pixel 314 (as eB—5/16). A fractional error value may be diffused from the pixel 308 to the next pixel 314 (as eC—3/16).

Accordingly, as shown, eB for the current pixel is eA for the next pixel. Further, eC for the current pixel is eB for the next pixel. Moreover, eC for the next pixel may be retrieved from the error buffer, and eD for the next pixel is from the error computation for the current pixel. A more detail description of this data flow is set forth below.

Figure 4:
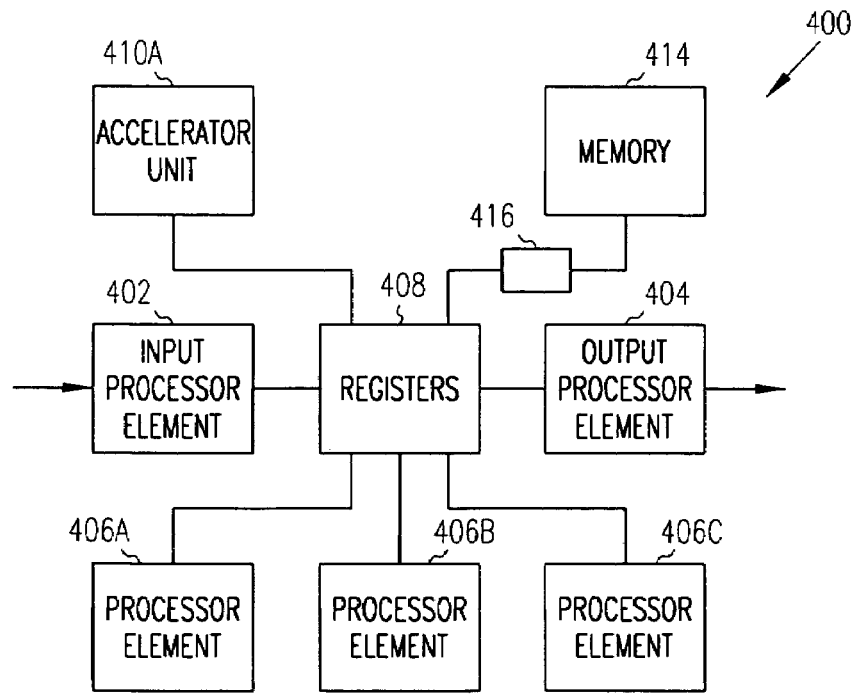
FIG. 4 illustrates a more detailed block diagram of an image signal processor, according to some embodiments of the invention.

FIG. 4 illustrates a more detailed block diagram of an image signal processor, according to some embodiments of the invention. An image signal processor 400 includes an input processor element 402, an output processor element 404, a number of processor elements 406A-406C, a number of registers 408, a number of accelerator units 410A-410B, a memory 414 and a memory controller 416. The input processor element 402, the output processor element 404, the processor elements 406A-406C, the accelerator units 510A-410B and the memory 414 (through the memory controller 416) are coupled to the registers 408. The registers 408 allow the processor elements 402, 404 and 406, the accelerator units 410A-410B and the memory 414 to exchange data and can be used as general purpose registers for a given processor element 402, 404 and 406 and the accelerator units 410A-410B. Moreover, the processor elements 402, 404 and 406 and the accelerator units 410A-410B may include a number of local registers (not shown).

In an embodiment, the input processor element 402, the output processor element 404 and the processor elements 406A-406C include an instruction memory and an arithmetic-logic unit (ALU) for processing data. The input processor element 402 and the output processor element 404 are coupled to ports of the image signal processor 400 through a port ring to receive data being input into and to transmit data being output from, respectively, the image signal processor 400. An architecture having such a configuration, according to some embodiments, is described in more detail below.

In addition to inputting and outputting of data, the input processor element 402 and/or the output processor element 404 may process the data similar to the processing provided by the processor elements 406A-406C. The different processor elements 406A-406C may be general-purpose processor elements or special-purpose processor elements. For example, the processor elements 406A-406C may be Multiply-Accumulate (MAC) processor elements that include an instruction set for general-purpose processing as well as an instruction set for MAC functionality. The processor elements 406A-406C may be a combination of general-purpose processor elements and special-purpose processor elements. For example, the processor elements 406A and 406C may be MAC processor elements, while the processor elements 406B may be a general-purpose processor element. While FIG. 4 illustrates five processor elements within the image signal processor 400, in other embodiments, a lesser or greater number of such processor elements may be incorporated into the image signal processor 400.

The input processor element 402 is a general-purpose processor element with a port interface as an input port. In an embodiment, the instructions within the input processor element 402 have the ports as additional input operands along with the registers 408 and the local registers within the input processor element 402. The output processor element 404 is a general-purpose processor element with a port interface as an output port. In an embodiment, the instructions within the output processor element 404 have the ports as additional output operands along with the registers 408 and the local registers within the output processor element 404.

Figure 5:
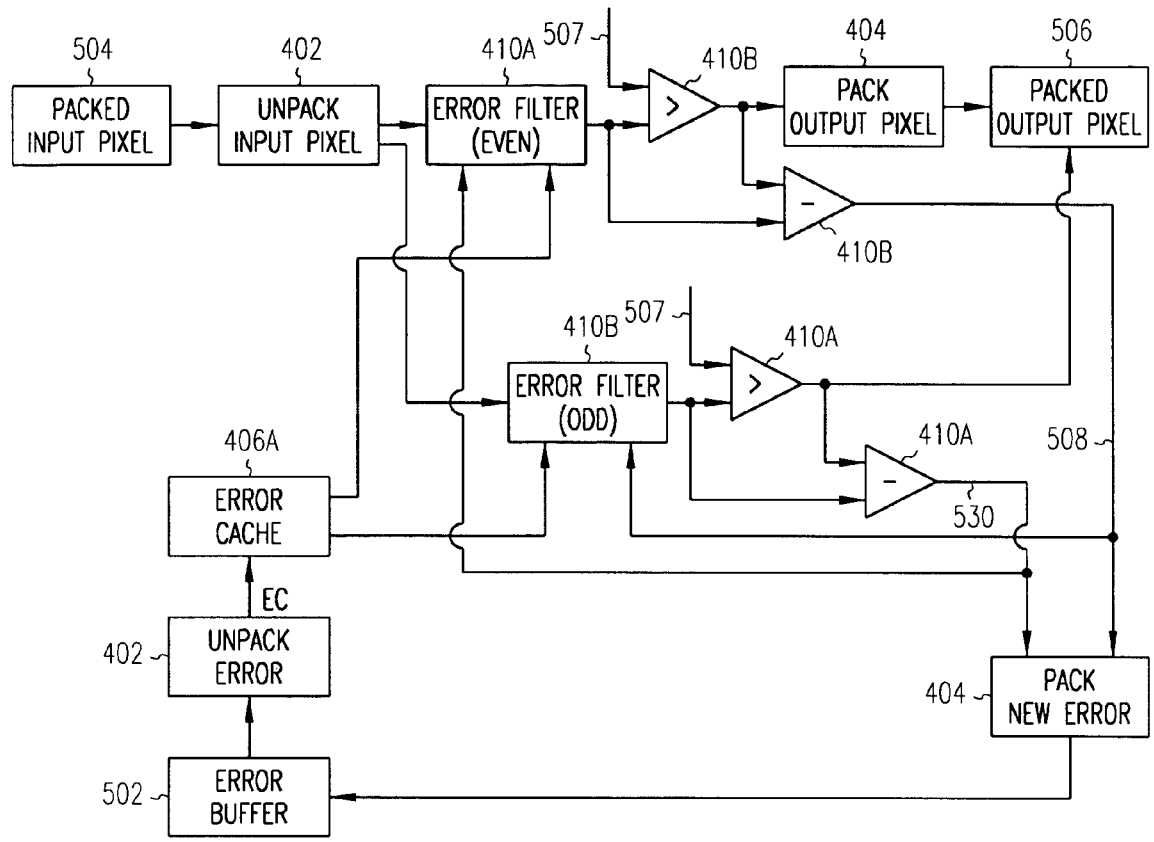
FIG. 5 illustrates a more detailed block diagram of an image signal processor for error diffusion operations, according to some embodiments of the invention.

FIG. 5 illustrates a more detailed block diagram of an image signal processor for error diffusion operations, according to some embodiments of the invention. In particular, FIG. 5 illustrates a more detailed block diagram of the image signal processors 400, according to some embodiments of the invention. FIG. 5 includes a number of the elements of FIG. 4, wherein a same element is distributed across a number of different blocks to illustrate the flow of data among such elements. Accordingly, a same reference element refers to different blocks within FIG. 5. Moreover, such blocks may include description of the type of operation performed therein.

The unpack input pixel block of the input processor element 402 is coupled to receive a packed input pixel 504. The unpack error block of the input processor element 402 is coupled to receive intermediate error values from an error buffer 502. An output from the unpack input pixel block of the input processor element 402 is coupled to an input of the error filter (even) block of the accelerator unit 410A and an input of the error filter (odd) block of the accelerator unit 410B.

An output from the unpack error block of the input processor element 402 is coupled to an input of the error cache of the processor element 406A. An output of the error cache of the processor element 406A is coupled to an input of the error filter (even) block of the accelerator unit 410A and an input of the error filter (odd) block accelerator unit 410B.

An output of the error filter (even) block of the accelerator unit 410A is coupled to an input of the comparison block and the subtractor block of the accelerator unit 410B. An output of the error filter (odd) block of the accelerator unit 410B is coupled to an input of the comparison block and the subtractor block of the accelerator unit 410A. A threshold input 507 is coupled to an input of the comparison blocks. The threshold input 507 may be different for the two different comparison blocks. An output of the comparison block of the accelerator unit 410B is coupled to an input of the subtractor block of the accelerator unit 410B and an input of the pack output pixel block of the output processor element 404. An output of the comparison block of the accelerator unit 410A is coupled to an input of the subtractor block of the accelerator unit 410A and an input of the pack output pixel block of the output processor element 404. The output from the pack output pixel block is the packed output pixel 506.

An output of the subtractor block of the accelerator unit 410B is coupled to an input of the pack new error block of the output processor element 404 and to an input of the error filter (even) block. An output of the subtractor block of the accelerator unit 410A is coupled to an input of the pack new error block of the output processor element 404 and to an input of the error filter (odd) block. An output of the pack new error block is coupled to an input of the error buffer 502. A more detail description of the operations of the block diagram of FIG. 5 is set forth below.

Figure 6:
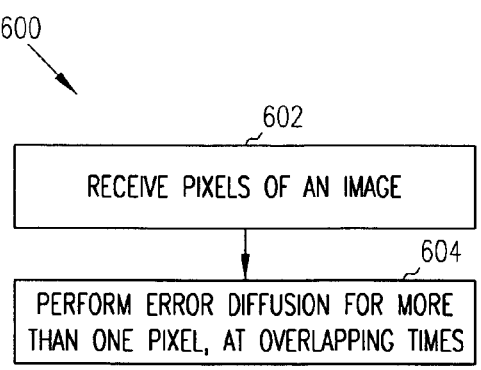
FIG. 6 illustrates a flow diagram for error diffusion-based image processing, according to some embodiments of the invention.

FIG. 6 illustrates a flow diagram for error diffusion-based image processing, according to some embodiments of the invention. In particular, FIG. 6 includes a flow diagram 600 that illustrates the operations of the image signal processor 400 shown in FIG. 5, according to some embodiments of the invention.

In block 602, pixels of an image are received. With reference to the embodiment of FIG. 5, the unpack input pixel block of the input processor element 402 may receive the pixels of the image. In some embodiments, the pixels may be received from a different image signal processor 400, a memory or input/output device (such as a sensor). For example, the pixels may be received from one of such components based on the data driven operations (as described above). In some embodiments, the image may be a continuous-tone digital image. Control continues at block 604.

In block 604, error diffusion is performed for more than one pixel, at least simultaneously in part. Error diffusion is performed for more than one pixel at overlapping times. In other words, the time of execution for error diffusion for one pixel overlaps with the time of execution for error diffusion of one or more other pixels. With reference to the embodiment of FIG. 5, the different blocks of the input processor element 402, the accelerator units 410A-410B, the processor element 406A and the output processor element 404 may perform such operations. A more detailed description of such operations is set forth below in conjunction with the description of FIG. 7.

FIG. 7 illustrates a table of operations for error diffusion-based image processing by multiple elements within an image signal processor, according to some embodiments of the invention. FIG. 7 illustrates a table 700 that sets forth the operations of the input processor element 402, the accelerator units 410A-410B, the processor element 406A and the output processor element 404, relative to each other. More specifically, the table 700 illustrates performing of error diffusion for more than one pixel, partially in parallel. In other words, the performing of error diffusion for one pixel is partially in parallel with the performing of error diffusion for one or more other pixels. The columns may be representative of the timing of such operations. Accordingly, operations in a same column may be performed simultaneously, at least in part.

At a first time point (column 702), the input processor element 402 and the accelerator unit 410A may perform operations. The unpack error of the input processor element 402 may read in two intermediate error values from the previous row from the error buffer 502. In particular, the unpack error block may read in $eC_{even}$ (eC used for the even pixel) and $eC_{odd}$ (eC used for the odd pixel) from the error buffer 502. Partially in parallel, the error filter (even) block of the accelerator unit 410A may receive eA from the error cache of the processor element 406A. The error filter (even) block may compute (1*eA) for the even pixel and notify the processor element 406A after completion of this computation.

At a second time point (column 704), the input processor element 402, the accelerator unit 410A and the processor element 406A may perform operations. The unpack error block of the input processor element 402 may unpack the error values, eC, for the even pixel and the odd pixel. Partially in parallel, the error filter (even) block of the accelerator unit 410A may receive eB from the error cache of the processor element 406A. The error filter (even) block may compute (5*eB) for the even pixel and notify the processor element 406A after completion of this computation. Partially in parallel, the processor element 406A may load the value of eB into eA. Additionally, the processor element 406A may notify the error filter (odd) block of the accelerator unit 410B after completion of this load operation. As described above, eB for the current pixel is eA for the next pixel. Because the accelerator unit 410A has completed using of eA for the even pixel, such value may be overwritten with eA for the odd pixel (eB for the even pixel).

At a third time point (column 706), the input processor element 402, the accelerator unit 410A, the processor element 406A and the accelerator unit 410B may perform operations. The unpack input pixel block of the input processor element 402 may read in two input pixels ($p_{even}$ and $p_{odd}$). Partially in parallel, the error filter (even) block of the accelerator unit 410A may receive eC from the error cache of the processor element 406A. The error filter (even) block may compute (5*eC) for the even pixel. Partially in parallel, the processor element 406A may load the value of eC into eB. Additionally, the processor element 406A may notify the error filter (odd) block of the accelerator unit 410B after completion of this load operation. Additionally, partially in parallel, the error filter (odd) block of the accelerator unit 410B may receive eA from the error cache of the processor element 406A. The error filter (even) block may compute (1*eA) for the odd pixel and notify the processor element 406A after completion of this computation.

At a fourth time point (column 708), the input processor element 402, the accelerator unit 410A, the processor element 406A and the accelerator unit 410B may perform operations. The unpack input pixel block of the input processor element 402 may unpack the two input pixels ($p_{even}$ and $p_{odd}$). The input processor element 402 may forward the input pixels ($p_{even}$ and $p_{odd}$) to the error filter (even) block of the accelerator unit 410A and the error filter (odd) block of the accelerator unit 410B, respectively. Partially in parallel, the error filter (even) block of the accelerator unit 410A may receive eD from the error cache of the processor element 406A. The error filter (even) block may compute (7*eD) for the even pixel. Partially in parallel, the processor element 406A may load the value of eB into eA. Additionally, partially in parallel, the error filter (odd) block of the accelerator unit 410B may receive eB from the error cache of the processor element 406A. The error filter (even) block may compute (5*eB) for the odd pixel and notify the processor element 406A after completion of this computation.

At a fifth time point (column 710), the accelerator unit 410A, the processor element 406A and the accelerator unit 410B may perform operations. The error filter (even) block of the accelerator unit 410A may compute the error value for the even pixel. Specifically, the error filter (odd) block may add together the computed fractional error values from the surrounding pixels (1*eA, 5*eB, 3*eC, and 7*eD) and divide the result by 16. Partially in parallel, the processor element 406A may load the value of eC into eB. Partially in parallel, the error filter (even) block of the accelerator unit 410B may receive eC from the error cache of the processor element 406A. The error filter (odd) block may compute (3*eC) for the odd pixel. Additionally, at some point after reading in the current two input pixels, the unpack input pixel block of the input processor element 402 may read in the next two input pixels.

At a sixth time point (column 712), the accelerator unit 410A and the accelerator unit 410B may perform operations. The error filter (even) block of the accelerator unit 410A may commence computing the error diffusion for the next unprocessed pixel (the next even pixel). The error filter (even) block may receive eA from the error cache of the processor element 406A. The error filter (even) block may compute (1*eA) for the even pixel and notify the processor element 406A after completion of this computation. Partially in parallel, the error filter (odd) block may compute the threshold for the even pixel. Referring to FIG. 5, the error filter (odd) block may perform the threshold operation shown in the code block 1606. Referring to FIG. 5, the comparison block for the accelerator unit 410B may determine whether the accumulated value for the even pixel is greater than a threshold value from the threshold input 507. The output from the comparison block may be a binary value (0 or 1) depending of whether the accumulated value for the even pixel exceeds the threshold value (as shown in the code block 406 of FIG. 4).

At a seventh time point (column 714), the accelerator unit 410A, the processor element 406A, the accelerator unit 410B and the output processor element 404 may perform operations. The error filter (even) block may receive eB from the error cache of the processor element 406A. The error filter (even) block may compute (5*eB) for the next even pixel and notify the processor element 406A after completion of this computation. Partially in parallel, the processor element 406A may load the value of eB into eA. Additionally, the processor element 406A may notify the error filter (odd) block of the accelerator unit 410B after completion of this load operation. Partially in parallel, the error filter (odd) block of the accelerator unit 410B may compute the error computation for the even pixel. Referring to FIG. 2, the error filter (odd) block may perform the error computation operation shown in the code statement 208. The subtractor block of the accelerator unit 410B may determine a difference between the actual value (the accumulated value) and the outputted value (zero or one). This error value (even) 508 is inputted into the error filter (odd) block of the accelerator unit 410B.

At an eighth time point (column 716), the accelerator unit 410A, the processor element 406A, the accelerator unit 410B and the output processor element 404 may perform operations. The error filter (even) block of the accelerator unit 410A may receive eC from the error cache of the processor element 406A. The error filter (even) block may compute (3*eC) for the next even pixel. Partially in parallel, the processor element 406A may load the value of eC into eB. Additionally, the processor element 406A may notify the error filter (odd) block of the accelerator unit 410B after completion of this load operation. Partially in parallel, the error filter (odd) block of the accelerator unit 410B may compute (7*eD) for the odd pixel. Partially in parallel, the pack output pixel block of the output processor element 404 may pack the value of the even pixel (received from the comparison block of the accelerator unit 410B). The packed output pixel block may output this value as the packed output pixel 506.

At a ninth time point (column 718), the accelerator unit 410B and the output processor element 404 may perform operations. The error filter (odd) block of the accelerator unit 410B may compute the error value for the odd pixel. Specifically, the error filter (odd) block may add together the computed fractional error values from the surrounding pixels (1*eA, 5*eB, 3*eC, and 7*eD) and divide the result by 16. Partially in parallel, the pack new error block of the output processor element 404 may update the error buffer 502 with this new error value for the even pixel.

At a tenth time point (column 720), the accelerator unit 410A and the accelerator unit 410B may perform operations. The error filter (even) block of the accelerator unit 410A may compute the threshold for the odd pixel. Referring to FIG. 5, the error filter (odd) block may perform the threshold operation shown in the code block 1606. The comparison block for the accelerator unit 410B may determine whether the accumulated value for the odd pixel is greater than a threshold value from the threshold input 507. The output from the comparison block may be a binary value (zero or one) depending of whether the accumulated value for the odd pixel exceeds the threshold value (as shown in the code block 206 of FIG. 2). Additionally, partially in parallel, the error filter (odd) block of the accelerator unit 410B may receive eA from the error cache of the processor element 406A. The error filter (even) block may compute (1*eA) for the next odd pixel and notify the processor element 406A after completion of this computation.

At an eleventh time point (column 722), the accelerator unit 410A, the processor element 406A, the accelerator unit 410B and the output processor element 404 may perform operations. The error filter (even) block of the accelerator unit 410A may compute the error computation for the odd pixel. Referring to FIG. 2, the error filter (odd) block may perform the error computation operation shown in the code statement 208. The subtractor block of the accelerator unit 410B may determine a difference between the actual value (the accumulated value) and the outputted value (zero or one). This error value (odd) 510 is inputted into the error filter (even) block of the accelerator unit 410B. Partially in parallel, the processor element 406A may load the value of eB into eA and notify the processor element 406A after completion of this computation. Partially in parallel, the error filter (odd) block of the accelerator unit 410B may receive eB from the error cache of the processor element 406A. The error filter (even) block may compute (5*eB) for the next odd pixel and notify the processor element 406A after completion of this computation. Partially in parallel, the pack output pixel block of the output processor element 404 may pack the value of the odd pixel (received from the comparison block of the accelerator unit 410A). The packed output pixel block may output this value as the packed output pixel 506.

At a twelfth time point (column 724), the accelerator unit 410A, the processor element 406A and the output processor element 404 may perform operations. The error filter (even) block of the accelerator unit 410A may receive eD from the error cache of the processor element 406A. The error filter (even) block may compute (7*eD) for the next even pixel. The processor element 406A may load the value of eC into eB and notify the error filter (odd) block of the accelerator unit 410B after completion of this load operation. Partially in parallel, the pack new error block of the output processor element 404 may update the error buffer 502 with the new error value for the odd pixel.

Some embodiments may incorporate error diffusion operations to output continuous-tone digital images on output devices (such as printers, screens, etc.) that have limited color (tone) range. Some embodiments may be used to perform error diffusion, partially in parallel, for more than one pixel. As described, some embodiments allow a processor to keep multiple execution engines occupied by processing multiple pixels non-serially or simultaneously at least in part. Moreover during this processing of multiple pixels, some embodiments share intermediate errors values from surrounding pixels. Accordingly, as described, this parallel processing of pixels of an image may continue until all of the pixels in the image are processed.

Figure 8:
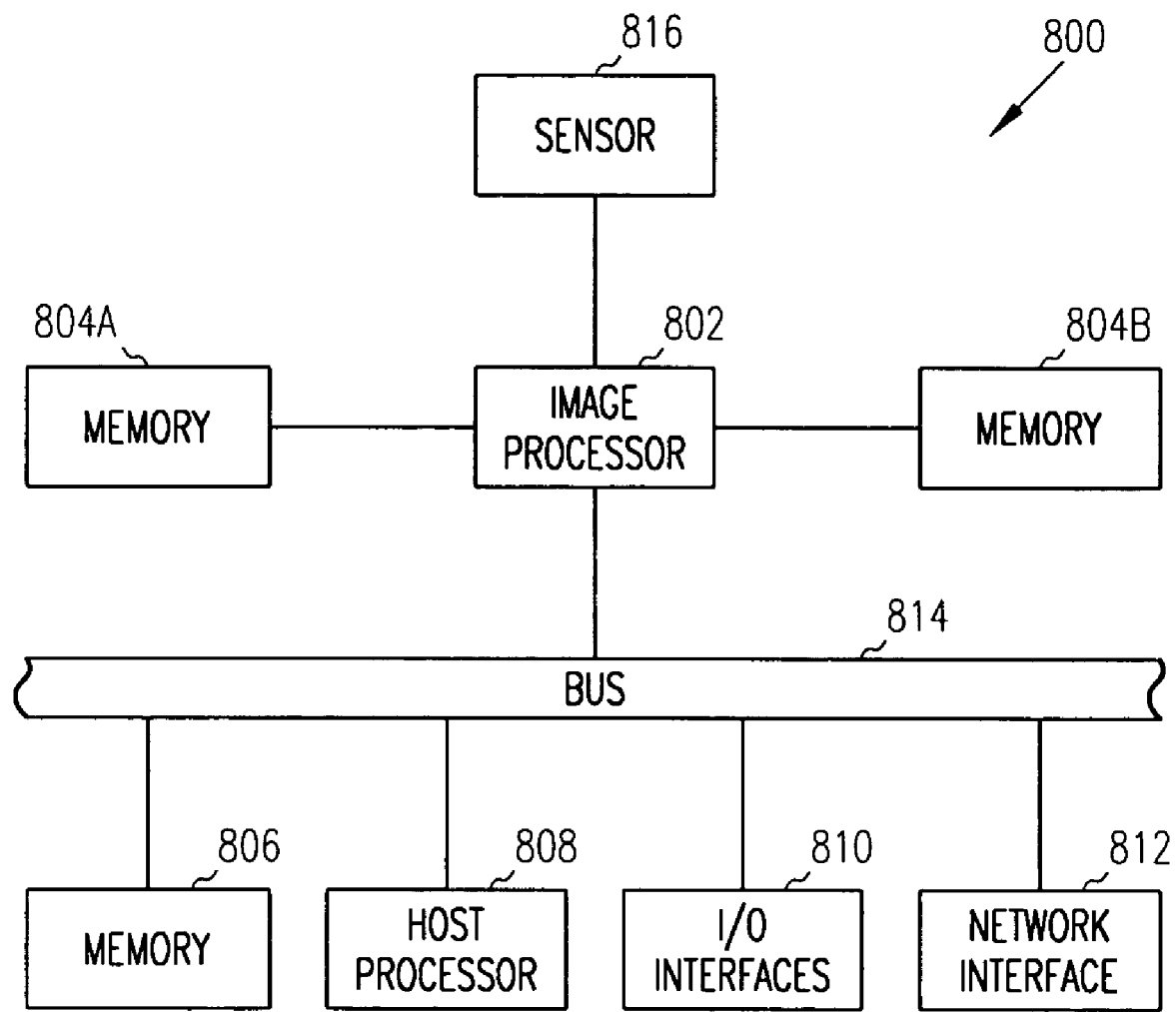
FIG. 8 illustrates a simplified block diagram of a system for error diffusion-based image processing, according to some embodiments of the invention.

The error diffusion operations described herein may operate in a number of different environments, a processor architecture according to some embodiments used to execute such operations is now described. In particular, FIG. 8 illustrates a processor architecture for performing error diffusion operations, according to some embodiments of the invention. FIG. 8 illustrates a system for processor-to-processor communication in a data driven architecture, according to some embodiments of the invention. FIG. 8 illustrates a system 800 that includes an image processor 802 that is coupled to receive an input data stream 818 from a sensor 816. While the sensor 816 may be of different types, in an embodiment, the sensor 816 is a Charge Coupled Device (CCD) sensor. In an embodiment, the sensor 816 is a Complementary Metal Oxide Semiconductor (CMOS) sensor. The sensor 816 scans and digitizes images, thereby producing the input data stream 818. For example, in an embodiment, the system 800 is embedded within a scanner that scans and processes images (such as documents, photos, etc.).

In an embodiment, the image processor 802 has an architecture that is data driven, wherein the transmission and receipt of data across different elements within the image processor 802 drives the execution of the operations therein. In other words, a given operation within an element of the image processor 802 commences when the necessary data is available for execution.

The image processor 802 is coupled to memories 804A-804B. In an embodiment, the memories 804A-804B are different types of random access memory (RAM). For example, the memories 804A-804B are double data rate (DDR) Synchronous Dynamic RAM (SDRAM). As will be described in more detail below, elements within the image processor 802 store data related to image processing into the memories 804A-804B. To illustrate, a processor element within the image processor 802 may store results from a first image processing operation into one of the memories 804A-804B, which is subsequently retrieved by a different processor element within the image processor 802 to perform a second image processing operation.

The image processor 802 is coupled to bus 814, which in an embodiment may be a Peripheral Component Interface (PCI) bus. The system 800 also includes a memory 806, a host processor 808, a number of input/output (I/O) interfaces 810 and a network interface 812. The host processor 808 is coupled to the memory 806. The memory 806 may be different types of RAM (e.g., Synchronous Dynamic RAM (SDRAM), DRAM, DDR-SDRAM, etc.), while in an embodiment, the host processor 808 may be different types of general-purpose processors. The I/O interface 810 provides an interface to I/O devices or peripheral components for the system 800. The I/O interface 810 may comprise any suitable interface controllers to provide for any suitable communication link to different components of the system 800. The I/O interface 810 for an embodiment provides suitable arbitration and buffering for one of a number of interfaces.

For an embodiment, the I/O interface 810 provides an interface to one or more suitable integrated drive electronics (IDE) drives, such as a hard disk drive (HDD) or compact disc read only memory (CD ROM) drive for example, to store data and/or instructions, for example, one or more suitable universal serial bus (USB) devices through one or more USB ports, an audio coder/decoder (codec), and a modem codec. The I/O interface 810 for an embodiment also provides an interface to a keyboard, a mouse, one or more suitable devices, such as a printer for example, through one or more ports. The network interface 812 provides an interface to one or more remote devices over one of a number of communication networks (the Internet, an Intranet network, an Ethernet-based network, etc.).

The host processor 808, the I/O interfaces 810 and the network interface 812 are coupled together with the image processor 802 through the bus 814. As will be further described below, instructions executing within the host processor 808 configure the image processor 802 for different types of image processing. For example, the host processor 808 establishes a number of different logical connections among the different processor elements within the image processor 802. Further, the host processor 808 may download microcode to and check the status of the different components in the image processor 802 therein. To illustrate, a more detailed description of one embodiment of the image processor 802 will now be described.

In the description, numerous specific details are set forth. However, it is understood that embodiments of the invention may be practiced without these specific details. In other instances, well-known circuits, structures and techniques have not been shown in detail in order not to obscure the understanding of this description. Numerous specific details such as logic implementations, opcodes, ways of describing operands, resource partitioning/sharing/duplication implementations, types and interrelationships of system components, and logic partitioning/integration choices are set forth in order to provide a more thorough understanding of the inventive subject matter. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism that provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general-purpose or special-purpose processor, programmed with the instructions, to perform methods or processes of the embodiments of the invention. Alternatively, the features or operations of embodiments of the invention are performed by specific hardware components that contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for error diffusion-based image processing, in accordance with some embodiments of the invention. A number of figures show flow diagrams illustrating error diffusion-based image processing, in accordance with some embodiments of the invention. The operations of the flow diagrams have been described with reference to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the inventive subject matter. What is claimed, therefore, are all such modifications as may come within the scope and spirit of the following claims and equivalents thereto. Therefore, the specification and drawings are to be regarded in an illustrative rather than a restrictive sense.

What is claimed is:

1. A method comprising:
   receiving values of a first pixel and a second pixel of an image at an input processor element of an image signal processor;
   distributing fractional parts of a number of values from surrounding pixels to the first pixel and the second pixel non-serially using first and second accelerator units, respectively, of the image signal processor;
   assigning output values to the first pixel and the second pixel based on the values of the first pixel and the second pixel and the fractional parts of the number of values from the surrounding pixels using an output processor element of the image signal processor; and
   outputting the output values to an output device that has a color range that is less than a color range of the image using the output processor element.

2. The method of claim 1, further comprising computing an error for the first pixel and the second pixel based on a difference between the values of the first pixel and the second pixel and the output values of the first pixel and the second pixel using the accelerator unit.

3. The method of claim 2, wherein receiving values of the first pixel and the second pixel of the image comprises receiving values of the first pixel and the second pixel of an approximately continuous-tone digital image.

4. The method of claim 1, wherein distributing fractional parts comprises computing a fractional part for the first pixel and for the second pixel non-serially using the accelerator unit.

5. The method of claim 1, wherein distributing fractional parts comprises computing a fractional part for the first pixel at overlapping times with assigning a value of one of the fractional parts to a different one of the fractional parts using the accelerator unit.

6. An image processing system comprising:
   an image signal processor; and
   a machine-readable medium that provides instructions which, when executed by the image signal processor, cause the image signal processor to perform operations comprising:
   receiving values of a first pixel and a second pixel of an image at an input processor element of the image signal processor; distributing fractional parts of a number of values from surrounding pixels to the first pixel and the second pixel, at overlapping times, using first and second accelerator units, respectively, of the image signal processor;
   assigning output values to the first pixel and the second pixel based on the values of the first pixel and the second pixel and the fractional parts of the number of values from the surrounding pixels using an output processor element of the image signal processor; and
   outputting the output values to an output device that has a color range that is less than a color range of the image using the output processor element.

7. The image processing system of claim 6, wherein the instructions, when executed by the image signal processor further cause the image signal processor to perform operations comprising computing an error for the first pixel and the second pixel based on a difference between the values of the first pixel and the second pixel and the output values of the first pixel and the second pixel.

8. The image processing system of claim 6, wherein the instructions, when executed by the image signal processor further cause the image signal processor to perform operations comprising computing the distributing of the fractional parts of the number of errors based on a Floyd-Steinberg error filter.

9. The image processing system of claim 8, wherein receiving values of the first pixel and the second pixel of the image comprises receiving values of the first pixel and the second pixel of an approximately continuous-tone digital image.

10. An image processor comprising:
    an input processor element to receive a first pixel and a second pixel of an image;
    a first accelerator unit coupled to the input processor to distribute fractional parts of a first number of values from first surrounding pixels of the image to the first pixel;
    a second accelerator unit coupled to the input processor to distribute fractional parts of a second number of values from second surrounding pixels of the image to the second pixel; and
    an output processor element coupled to the first and second accelerator units and to the input processor element, the output processor element configured to assign output values to the first pixel and the second pixel based on the values of the first pixel and the second pixel and the fractional parts of the number of values from the surrounding pixels, the output processor further configured to provide the output values to an output device that has a color range that is less than a color range of the image.

11. The image processor of claim 10, wherein the first and second accelerator units process the first and second pixels at overlapping times.

12. The image processor of claim 10, further comprising:
    a register coupled to the input processor element; and
    a processor element configured to load an error value into the register and to notify at least the second accelerator unit when the error value is loaded.

13. The image processor of claim 10, wherein the first and second accelerator units are configured to compute threshold values for the first and second pixels and to selectively assign a value to first and second pixel locations based on the computed threshold values.

* * * * *

UNITED STATES PATENT AND TRADEMARK OFFICE
CERTIFICATE OF CORRECTION

| | | |
|---|---|---|
| PATENT NO. | : 7,639,887 B2 | Page 1 of 1 |
| APPLICATION NO. | : 11/011737 | |
| DATED | : December 29, 2009 | |
| INVENTOR(S) | : Eric J. Roberts | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Twenty-first Day of December, 2010

David J. Kappos
*Director of the United States Patent and Trademark Office*